Aug. 9, 1960     L. P. BROWN     2,948,550
FOLDING STEP ATTACHMENT
Filed March 6, 1959
*Fig. 1*
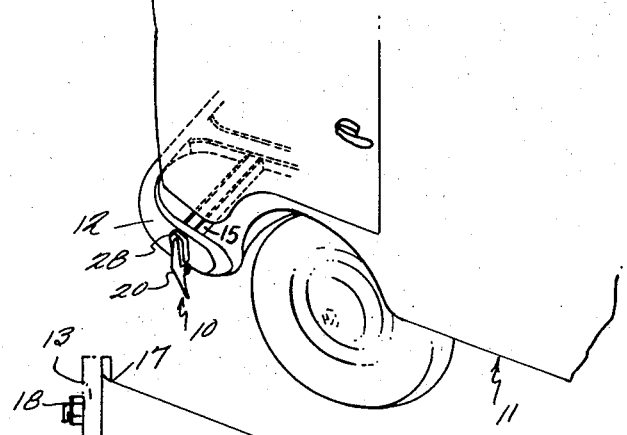
*Fig. 2*
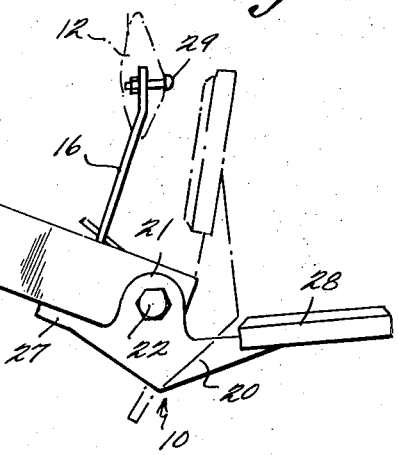
*Fig. 4*
*Fig. 3*
INVENTOR
LOYD P. BROWN
BY
Kimmel & Crowell
ATTORNEYS United States Patent Office 2,948,550
Patented Aug. 9, 1960

2,948,550

FOLDING STEP ATTACHMENT

Loyd P. Brown, 4210 S. Peoria Ave., Tulsa, Okla.

Filed Mar. 6, 1959, Ser. No. 797,689

1 Claim. (Cl. 280—166)

The present invention relates to folding step attachments and particularly to such attachments for motor vehicles.

The primary object of the invention is to provide a folding step attachment for motor vehicles which can be moved to a position of use by the foot and will automatically fold into a non-use position under spring tension.

Another object of the invention is to provide a folding step of the class described above which is attached to the vehicle by a minimum of securing elements.

A still further object of the invention is to provide a folding step attachment for vehicles which is readily accessible for use and which remains out of the way when in retracted position.

Other objects and advantages will become apparent in the following specification when considered in light of the attached drawings, in which:

Figure 1 is a fragmentary perspective view illustrating the invention attached to one corner of a vehicle;

Figure 2 is a rear elevation of the invention illustrated in extended position;

Figure 3 is a rear elevation of the invention shown attached to the other side of the vehicle with the step in retracted position;

Figure 4 is a fragmentary top plan view of the structure illustrated in Figure 3.

Referring now to the drawings in detail wherein like reference characters indicate like parts throughout the several figures, the reference numeral 10 indicates generally a folding step attachment for motor vehicles constructed in accordance with the invention.

The folding step attachment 10 is used with a motor vehicle illustrated generally at 11 having an arcuate bumper 12, a bumper support bar 13 and a horn bracket 14 of conventional construction.

The folding step attachment 10 includes an elongated channel support member 15 having a bracket plate 16 welded thereto adjacent the outer end thereof. The inner end 17 of the support 15 is secured to the bumper support bar 13 by a bolt 18, or is secured to a horn bracket 14 by a bolt 19, depending on which side of the motor vehicle 11 the step 10 is to be placed.

A step plate 20 is provided with a pair of spaced apart parallel ears 21 which are engaged on opposite sides of the channel support 15 and pivotally secured to the outer end thereof by a pivot bolt 22 extending therethrough. A coil spring 23 encompasses the pivot bolt 22 and has an end 24 thereof extending through an opening 25 in the plate 16 and the opposite end 26 bearing against the lower end of the step plate 20.

A stop 27 is integrally formed on the lower end of the step plate 20 for engaging the underside of the channel support 15, as seen in Figure 2, with the step plate 20 in horizontal position. A pad 28 is secured to the opposite end of the step plate 20 and provides a foot support when in the lowered position illustrated in Figure 2.

The bracket plate 16 has the upper end thereof secured to the bumper 12 by means of a bolt 29 so that the step 10 is rigidly secured to the motor vehicle 11.

In many motor vehicles, particularly of the station wagon and truck type, the height of the cab floor is sufficiently above the street level to render it virtually impossible to step directly from the street level to the cab floor, and in such cases the step attachment of the instant invention provides means for permitting access to the motor vehicle with ease.

Having thus described the preferred embodiment of the invention, it should be understood that numerous structural modifications and adaptations may be resorted to without departing from the scope of the appended claim.

What is claimed is:

A step attachment for a motor vehicle having a bumper and bumper support arms, comprising an elongated channel support bar, a bracket plate welded to the outer end of said bar and secured to said bumper, a bolt at the inner end of said support bar adapted to secure said support bar to a bumper support arm, a step plate, a pair of parallel spaced apart ears on said step plate at an intermediate point, said ears and said channel support bar having aligned apertures therethrough, a pivot bolt extended through said apertures pivotally mounting said step on said channel support bar, a coil spring surrounding said bolt having one end bearing against one end of said step plate, said bracket plate having an opening therein, the other end of said spring extending through said opening, an integral stop formed on said one end of said step plate for engaging the underside of said channel support bar when said step plate is in horizontal position, and a pad on the opposite end of said step plate.

References Cited in the file of this patent

UNITED STATES PATENTS

| 1,026,102 | Mather | May 14, 1912 |
| 1,523,311 | Swayze et al. | Jan. 13, 1925 |
| 1,877,152 | Vogel | Sept. 13, 1932 |

FOREIGN PATENTS

| 6,570 | Great Britain | of 1898 |